March 22, 1927.

F. KASANTZEFF

AIR BRAKE FOR RAILWAYS

Filed July 11, 1924

Inventor.
Florentin Kasantzeff
By — B. Singer
atty.

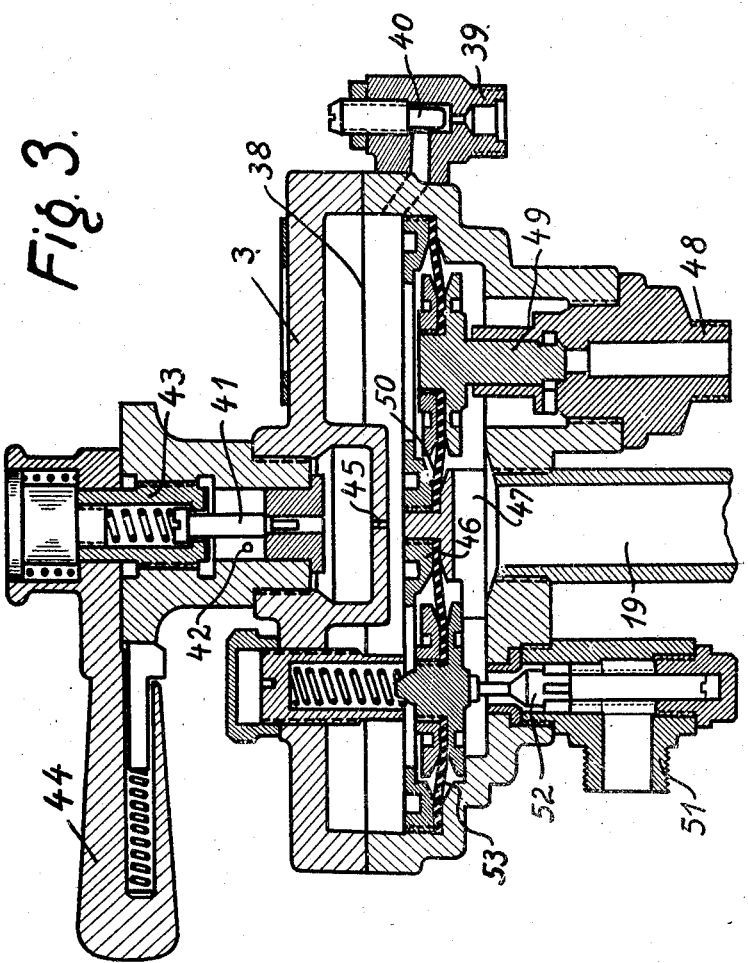

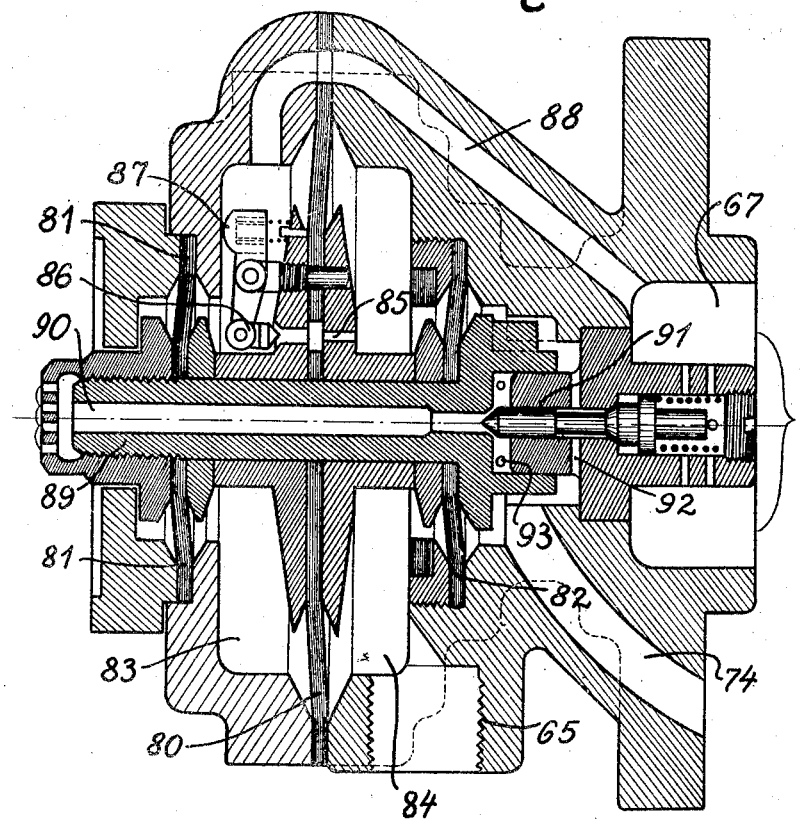

Patented Mar. 22, 1927.

1,621,987

UNITED STATES PATENT OFFICE.

FLORENTIN KASANTZEFF, OF BERLIN, GERMANY.

AIR BRAKE FOR RAILWAYS.

Application filed July 11, 1924. Serial No. 725,444.

In known railway brakes acting by air pressure the different braking actions are automatically maintained against augmenting or diminishing, by making up all losses from leakage by filling up the necessary quantities of compressed air. The different braking grades are got by exhausting such a part of the air contained in the air pipe as seems necessary, and specially a partial lifting of the brakes is attained by complete or almost complete lifting and subsequent partial braking; this causes an unnecessarily great amount of compressed air to be used and the action of braking becoming slow and unsure.

The invention consists therein, that the brake in combination with the engineer's valve contains a device which at every position of the engineer's valve produces a specially measured pressure in a governing chamber, and this independently from the question, from which former position the handle of the engineer's valve has been brought to the new position. With special advantage this adjustable pressure may be obtained dynamically, the governing chamber having an air inlet of constant cross section and an air outlet of a cross section variable by the handle of the engineer's valve. Thus with a very small consumption of compressed air several grades of pressure are very precisely adjustable by a valve, which may be easily handled, the handle having only to move a very small outlet valve and all further operations being automatic.

The invention relates further to the later described details which serve for the automatic performance of the various movements and give the possibility of a very effective and sure braking and brake lifting action, as well with one piped brakes as with two piped brakes.

A special feature of the invention, when constructed as a two piped brake consists in the combination with a regulating valve which causes an increased pressure in the main pipe to produce a diminished pressure in the feed pipe, and inversely a diminished pressure in the main pipe to cause an increased pressure in the feed pipe. This produces an increased difference of pressures which very quickly runs through the pipes and produces quick and precise action of the brakes with the desired braking grade even in very long trains, so that even the last wagons of long and heavy trains are braked with precisely the desired braking grade.

The invention comprises further details for precisely maintaining every adjusted grade of braking by automatically supplying air for making up leakage losses, so that neither undesired increasing of the action by air leakage from the main nor undesired diminishing of the action by air leakage from the brake cylinders may arise.

In the accompanying drawing the invention is shown by way of example as a complete brake of the two piped system.

Fig. 3 is a section of the engineer's brake valve.

Fig. 6 is a section of the distributor of a wagon brake cylinder.

Figure 1:
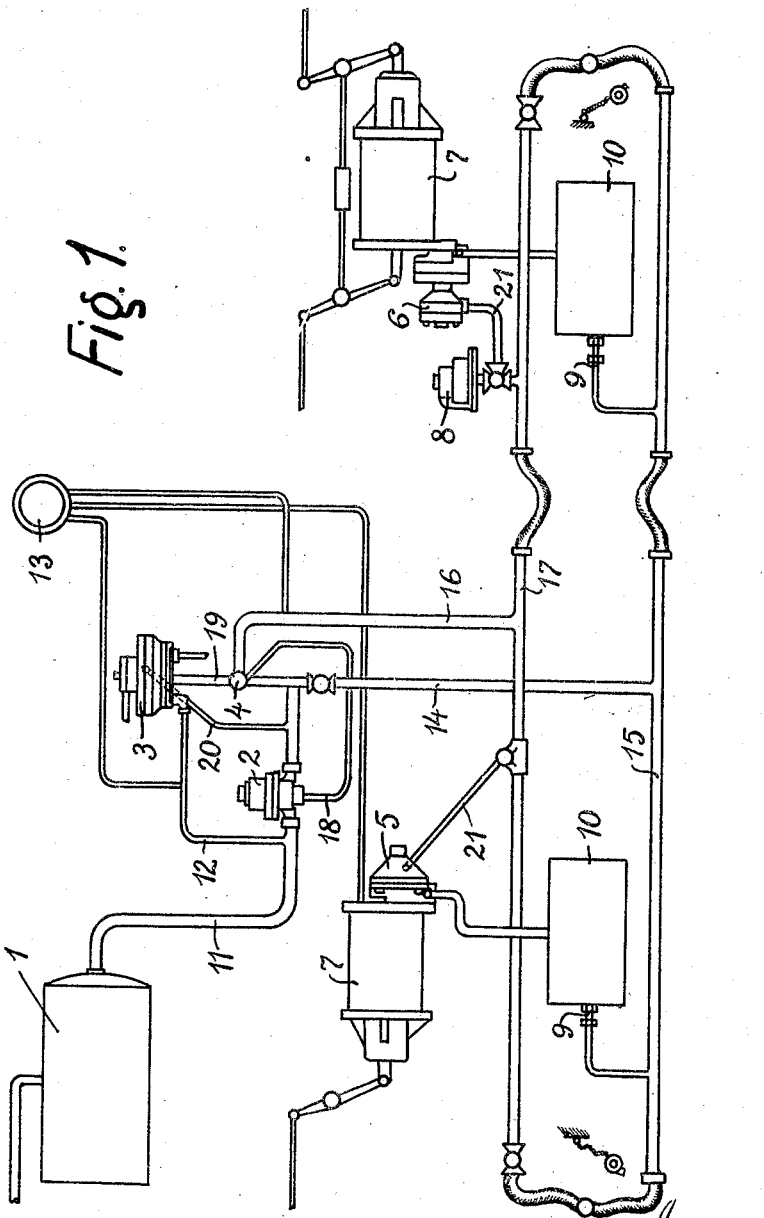
Fig. 1 is a simplified showing of the whole brake on the locomotive and on one wagon.

The whole arrangement and action of the brake, firstly described by the aid of the diagram Fig. 1 is the following.

A main air container 1 feeds air to the single devices, which bear the reference numbers according to their single figures and are the following: the regulating valve 2, the engineer's valve 3, the switch cock 4 and the distributor 5 of the brake cylinder 7, all on the locomotive; further the distributor 6 of a wagon brake cylinder 7 accelerators 8 are provided and feed valves 9 are arranged on all the auxiliary containers 10 of the wagons and the locomotive.

From the main container a connection 11 goes to the regulating valve 2, further with a branch 12 to the leaders valve 3 and to the multiple manometer 13. The regulating valve 2 is connected to a branch 14 of the feed pipe 15, and therewith by a switch cock 4 an atmospheric outlet and a branch 16 of the main 17 is joined; the regulating valve 2 is further connected to the branch 16 by an auxiliary tube 18, and the engineer's brake valve 3 has a connection 19 to the switch cock 4 and a further connection 20 to the feed pipe 14, 15.

The auxiliary container 10 on the locomotive, fed by the feed pipe 15, is connected to the locomotive brake cylinder by the distributor 5, which in its turn is connected to the main 17 by a branch 21. The multiple manometer 13 has connections to the locomotive brake cylinder and to the main pipe branch 16 for controlling the pressures existing therein.

On the wagons the auxiliary containers 10 are fed from the feed pipe 15 and connected to the distributors 6 of the brake cylinders, the said distributors being connected by branches 21 to the main 17, commonly with accelerators 8.

The devices on the locomotive acts as follows.

The regulating valve 2 produces in the feed pipe 15 the constant normal pressure, for instance 3, 5 atmosphere, and it is dependent upon the auxiliary tube 18 together with the pressure in the main 17 in such manner, that on a pressure reduction in the main 17 it produces an increased pressure in the feed pipe 15, or inversely on a pressure increase of the main 17 it reduces the pressure on the feed pipe 15.

The engineer's valve 3 in its first handle position lifts the brake by filling the main 17, and in four further positions (or in any desired number of further positions) it produces different minor pressures in the main for correspondingly graduated braking actions, this by simply moving the handle of the engineer's valve to the different positions, independently of the fact that the handle may have previously been in the brake lifting or braking position or in any intermediate position.

The switch cock 4 has one running position, in which it connects the main branch 16 to the engineer's valve branch 19 for enabling the leader to handle the brake. In the other positions it governs special conditions as emergency braking, accelerated filling of the pipes and cutting of the engineer's valve from the pipes when running with two locomotives.

The distributors 5 and 6 on the locomotive and on the wagons, and the remaining parts act in the known manner, with the exception that they contain special parts, by which they use also the varying pressures in the feed pipe for an accelerated and strengthened braking and brake lifting action in the brake cylinders.

The single parts are the following, described with the aid of their special illustrations.

Figure 2:
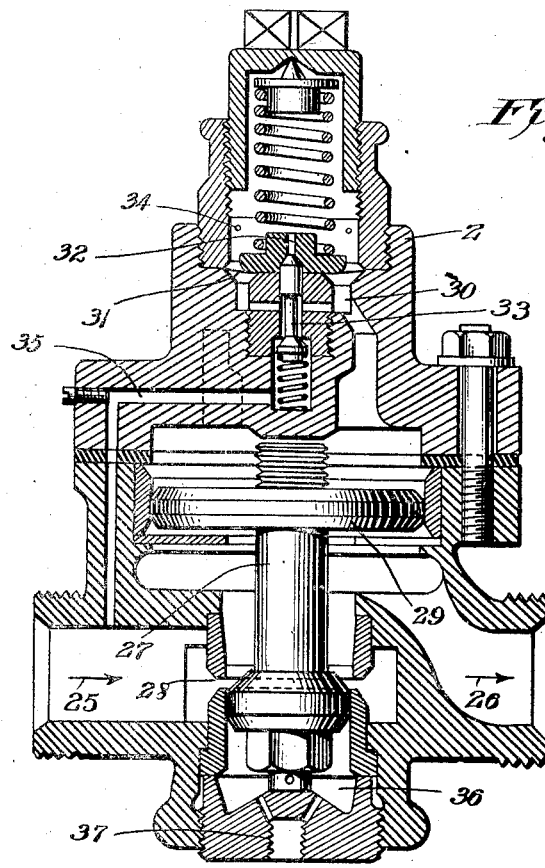
Fig. 2 is a section of the regulating valve inserted between the main air container, the feed pipe and the main air pipe.

The regulating valve 2 (Fig. 2) is connected by its channel 25 to the main container connection 11 and by its other channel 26 to the feed pipe branch 14; the connection between both said channels is governed by a piston 27, which runs over ports 28 provided in its cylinder. This piston is rigidly joined to a further piston 29 whose lower face is under the pressure existing in the channel 26. The space above the piston 29 is connected to a diaphragm chamber 30, which is closed by a diaphragm 31. This diaphragm has a perforation 32, and a double valve 33 is so arranged that it shuts up the said perforation 32 so long as the pressure in the chamber 30 is not able to lift the diaphragm; if the diaphragm is lifted, the said passage becomes free, so that the chamber 30 and the upper face of the piston 29 are connected to an atmospheric outlet 34 above the diaphragm. If on the other hand the diaphragm goes far down the double valve 33 opens the chamber 30 to a connecting channel 35, which leads to the channel 25 and to the main container.

The lower face of the smaller piston 27 lies in a space 36, whose inlet 37 by the auxiliary tube 18 (Fig. 1) is connected to the main air pipe.

The relations of areas of the pistons 27 and 29 and of the diaphragm 31 and its loading spring are so chosen, that in case the normal pressure of 3, 5 atmosphere is lost in chamber 30, the diaphragm 31 causes air from the main container to be added or air to be exhausted, so that the normal pressure is always restored. The piston 29 thereby is loaded by a constant pressure on its upper side. The remaining three piston surfaces are connected to the main and to the feed pipe, so that in the first position of the engineer's valve all the pipes receive the equal normal pressure and maintain said pressure owing to the fact that a reduction of this pressure partially unloads the great piston 29, so that the pistons go downward and supply air by the channel 28 so as to restore the right pressure.

If in consequence of any braking position of the engineer's valve the pressure in the main is reduced, this reduction acts through the channel 37 and the space 36 on the smaller piston, so that the pistons go downward and supply air so as to produce an increased pressure and an augmented air supply to the channel 26 and the feed pipe; thereby the action on the distributors and brake cylinders is accelerated and strengthened. Inversely the brake lifting position of the engineer's valve produces complete filling of the space 36 below the small piston, and therefore the pistons go quickly upward and close the channels 28, thus restoring the normal pressure in the pipes.

The engineer's valve 3 (Fig. 3) has a main or regulating chamber 38, which by a channel 39 is connected the pipe 20 coming from the regulating valve 2, and has therefore the normal air pressure. The pressure variations in this chamber, which serve for the braking actions, are produced dynamically by altering the relation between an entering and an exhausting cross sections of air on this chamber. For this purpose the inlet channel 39 contains a regulating screw 40, which serves to precisely adjust the inlet cross section. The outlet cross section is formed by a conical needle valve 41, which leads to a space communicating by a channel 42 with the atmosphere and is held under the insertion of a spring in the threaded head 43 of the handle 44, so that by movements of said handle it is moved from shutting position to different opening positions up to a maximum opening. The air currents thus produced through the chamber 38 cause different dynamical reductions of pressure to arise in said chamber, corresponding to different braking grades.

Between the chamber 38 and the needle valve 41 an intermediate wall with a narrow opening 45 is arranged for softening the pressure alterations.

The chamber 38 is separated by a partition wall 46 from a second chamber 47, connected to the main tube 19 leading to the system. This second chamber contains an exhaust channel 48 and a shutting valve 49, which is fastened to a diaphragm situated in the wall 46. The same second chamber is further provided with a channel 51, connected to the tube 12 (Fig. 1) coming from the main container, and an outwardly opening valve 52 is situated in this channel so as to touch a further diaphragm 46, which is situated in the wall 46 and is loaded by a spring.

The engineer's valve acts as follows. The both diaphragms, according to the pressure adjusted in the first chamber 38, open and shut alternatively the valves 49 and 52, thus producing in the second chamber and in the main, attached thereto, always precisely the same pressure and maintaining this pressure against any leakage through any valves or containers.

Figure 4:
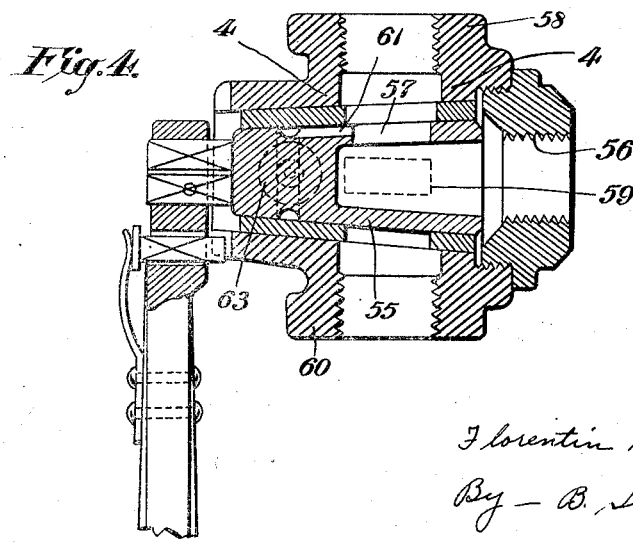
Fig. 4 is a section of a switch and emergency cock.

In the main connection 19 the switch cock 4 (Fig. 4) is so inserted, that its cone 55 by the mouth 56 and an axial boring is in continuous connection with the main branch 16. A port 57 of this cone comes into connection either with a channel 58 and with the tube 19 leading to the engineer's valve, or with an atmospheric outlet 59 or with a channel 60 leading to the feed pipe branch 14. The first or running position causes the pressures produced by the engineer's valve to be transmitted to the main air pipe. The second position serves for emergency braking by quickly emptying the main through the atmospheric port 59. The third position causes the main being quickly filled from the feed pipe and from the regulating valve 2. A fourth position in which the port 57 is completely closed, serves for making ineffective the brake handling means for enabling the brake to be handled from a second locomotive.

In all the said positions of the cock by an axial channel 61 and an annular channel 62 of the cone, a channel 63 connected to the auxiliary tube 18 coming from the regulating valve 2 is connected to the main air pipe, so that the said pipe 18 is always in shortest connection with the ports 58, 59, 60 which determine the pressure in the main; hereby quickest action of the pressure existing in the main upon the regulating valve 2 is ensured.

The special governing means of every single brake comprise firstly on the locomotive the distributor 5 (Fig. 5) which is immediately fastened to the brake cylinder. The distributor contains a chamber 64, which by a channel 65 communicates with the branch 21 of the main. This chamber is confined on one side by a piston 66 whose second surface form part of a chamber 67 connected to the appertaining auxiliary container 10. The piston 66 by its hollow nave, which contains an air channel 68, envelops a bearing 69 and channel 70 and a valve stem 71 situated in the latter, which valve stem is adapted to shut up the opening 68 and bears a piston 72 running tightly in the casing. The chamber 73 on one side of this piston is connected by a channel 74 to the interior of the brake cylinder, while the chamber 75 on the other side of the said piston communicates with the atmosphere by a channel 76. A further channel 77 leads also from the first named chamber 73 to the atmosphere, but only in certain positions of the piston 72, in which it is not obturated by the latter.

The chamber 73 is provided with a further valve 78, which is in such coaxial situation relatively to the pistons, that it may be lifted by the piston 72, thus connecting the chamber 73 to a channel 79 leading to the auxiliary container.

This distributor acts as follows. In running position of the leaders valve the air pressure from the main penetrates to the channel 65 and to the chamber of the great piston 66 and pushes the latter outward. Through the channel 70 and the now opened valve 71, 68, the air enters the auxiliary container, and the piston remains on its abutment.

When the first braking of the engineer's valve is assumed the pressure of the main on the piston is reduced whilst the pressure inward, shuts the valve 71, 68 and disconnects the space 67 on the other side of the piston is augmented. Thereby the piston runs in the auxiliary container from the main; when further traveling it takes along with itself the small piston 72, which shuts up the outlet 77 from the brake cylinder channel 74, opens the valve 78 and thereby connects the auxiliary air container through the channel 79 to the brake cylinder channel 74. The pressure in the brake cylinder thereupon increases and removes the piston 72 entire with the great piston 66 so far, that the valve 78 is shut, and thus the pressure in the braking cylinder is maintained in such a grade, that the pistons assume a middle position balanced by the different pressures and make up every unbalancing leakage by supplying air through the valve 78 or by exhausting air through the outlet 77.

The relation of surfaces of the pistons and their nave like bearings destines the relation between the pressures arising in the brake cylinder and the pressures in the auxiliary container and the main. For instance the first braking grade in these devices produces the pressures of 1, 0; 3, 5; 3, 2 atmosphere. In the second braking grade these pressures are 1, 9; 3, 6; 3, 0 atmosphere, in the third 2, 8; 3, 7; 2, 8 atmosphere; and in the fourth 3, 75; 3, 75, 2, 65 atmosphere. In the brake lifting position these pressures are 0, 0; 3, 5; 3, 5 atmosphere.

The distributor 6 (Fig. 6) used for the wagons has also a main air pipe channel 65, a braking cylinder channel 74 and an auxiliary container channel 67, but the single parts are of special construction for ensuring a specially precise and sensitive action.

Between a great diaphragm 80 and two lateral diaphragms 81, 82, of which the last is the smallest, two chambers 83, 84 are included. In the great diaphragm 80 a perforation 85 is provided, and for shutting this perforation a valve 86 is so arranged with a supporting lever 87, that this latter strikes against the casing wall and the valve is opened, as soon as the diaphragm is bent to this side. This same chamber 83 communicates by a channel 88 with the auxiliary container channel 67.

The second chamber 84 communicates with the main channel 65.

The smallest diaphragm 82 is fastened to a bolt 89, which crosses all the diaphragms and holds them together, so that they form a commonly swinging system. The bolt 89 has a longitudinal bore 90 leading to the atmosphere and obturated by a double valve 91 which governs the alternative connections of the brake cylinder channel 74 with the atmospheric outlet 90 and, by a connecting space 92, with the space 67 of the auxiliary air container. The guiding head of the bolt 89 is perforated by holes 93 establishing the connection between the space 74 and the seat of the double valve 91 in the bore 90.

This distributor acts as follows. In the running position of the engineer's valve from the main the normal pressure is transmitted to the chamber 84 and brings the diaphragms to the shown position, in which the valve 86 of the diaphragm 80 is opened and the same pressure exists also in the second chamber 83. As the diaphragm 81 is greater than the diaphragm 82, this position is maintained, and the brake cylinder is connected through 74, 93, 91, 90 to the atmosphere and the brake is lifted, whilst simultaneously between the chambers 83 and 84 complete equalization of pressures is produced.

If by any braking position of the engineer's valve the pressure in the main in the chamber 84 is reduced for a certain degree, the diaphragm system goes to a middle position, in which the valve 86 is closed; thereby the pressure of the auxiliary container, augmented by the formerly described influence of the regulating valve 2 in this moment acts through 67, 88, 83 onto the left side of the great diaphragm 80; thus a balanced state is reached, in which the system shuts the double valve 91 on the outlet 90 and opens it so as to connect the auxiliary container channel 67 to the brake cylinder channel 74, thus producing a braking action of a certain degree. The pressure now existing in the brake cylinder acts upon the smallest diaphragm 82 and removes again the system to the left, until final equilibrium is reached. In this way the pressures of the main 17 and of the feed pipe 15, transmitted to the chambers 84 and 83 produce a certain brake cylinder pressure acting upon the smallest diaphragm 82, so that the system in every case moves to and fro and by the double valve 91 regulates the brake cylinder pressure so as to maintain the right degree in spite of air losses by any leakage.

Figure 5:
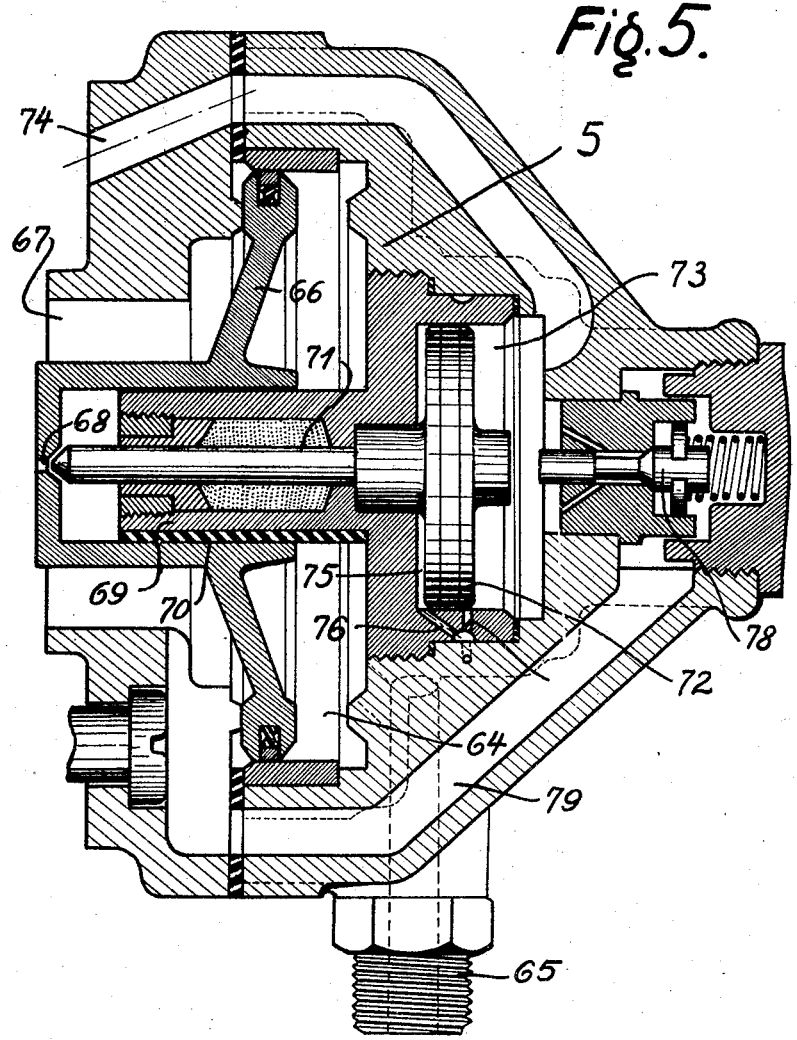
Fig. 5 is a section of the distributor of the locomotive brake cylinder.

Thus the action of producing and maintaining the different braking grades is the same as in the locomotive distributor (Fig. 5).

The whole brake acts as follows.

The regulating valve 2 imparts a constant air pressure to the feed pipe 15 and the engineer's valve 3 imparts in running position the same constant pressure to the main 17. As soon as by the engineer's valve 3 in the main 17 for braking purposes a reduced pressure is produced, the regulating valve 2 produces an increased pressure in the feed pipe 15. The distributors 5 and 6 in the first named position connect the brake cylinders to the atmosphere and join the circuit between the main 17 and the feed pipe 15; in every further position they come into middle position under the influence of the pressure difference between main 17 and feed pipe 15, and thereby they produce in the brake cylinders a certain pressure so as to be balanced by the pressures of the main 17, the feed pipe 15 and the brake cylinders. Each of the said valves maintains automatically the precise pressures by making up every alteration of pressure arising from any leakage, by adding or exhausting compressed air.

The accelerators 8 produce the usual effect of accelerated adjustment of the said pressures even on the last wagons of long trains, by completing every beginning difference of pressures more quickly to the desired height.

The switch cock 5 produces the emergency braking action, accelerated filling of the pipes and the cut off of the whole governing means from the main, when running with two locomotives.

The whole brake can be coupled with other known air brakes; it is then advised to insert the wagons fitted with the new brake next to the locomotive, for enabling them to completely have their advantageous action.

I claim:

1. Air brake for railways comprising in combination with the engineer's valve, a train air pipe, a handle, a governing chamber, a compressed air inlet and an air outlet on said chamber, means connected to said handle for altering the cross-section of only one of said air passages, the other remaining constant, so as to produce different pressures in said chamber at different positions of said handle, and means for producing corresponding pressures in the train air pipe.

2. Air brake for railways comprising in combination with the engineer's valve a train air pipe, a handle, a governing chamber, a compressed air inlet of constant cross section on said chamber, an outlet valve connected to the handle of the engineer's valve so as to open different cross sections in different positions of said handle and thereby produce different pressures in said chamber, and means for producing corresponding pressures in the train air pipe.

3. Air brake for railways comprising in combination with the engineer's valve a train air pipe, a handle, a governing chamber, a compressed air inlet of constant cross section on said chamber, an outlet valve connected to the handle of the engineer's valve so as to open different cross sections in different positions of said handle and thereby produce different pressures in said chamber, a second chamber connected to the train air pipe and separated from the said first chamber by a partition wall, two diaphragms in said partition wall, the one combined with an air outlet and the other with a compressed air inlet for the said second chamber, so as to produce in the second chamber the same pressures which exist in the first chamber.

4. Air brake for railways comprising in combination with the engineer's valve a train air pipe, a handle, a governing chamber, a compressed air inlet of constant cross section on said chamber, an outlet needle valve connected to a threaded part movable by the handle of the engineer's valve so as to open different cross sections in different positions of said handle and thereby produce different pressures in said chamber, and means for producing corresponding pressures in the train air pipe.

5. Air brake for railways comprising in combination with the engineer's valve a train air pipe, a handle, a governing chamber, a compressed air inlet of constant cross section in said chamber, a pressure equalizing valve inserted before said inlet, an outlet valve connected to the handle of the engineer's valve so as to open different cross sections in different positions of said handle and thereby produce different pressures in said chamber, a second chamber connected to the train air pipe and separated from the said first chamber by a partition wall, two diaphragms in said partition wall, the one combined with an air outlet and the other with a compressed air inlet, coming from the main container, for the said second chamber, so as to produce in the second chamber the same pressures which exist in the first chamber.

6. Air brakes for railways comprising a train air pipe, an auxiliary container, a brake cylinder and a distributor with three chambers connected to the train air pipe, the brake cylinder and the auxiliary container respectively, movable surfaces in the said three chambers under the action of the respective air pressures, and valves operatively connected to said movable surfaces so as to admit or exhaust air to or from the brake cylinder until an equilibrium of pressures is established on the said movable surfaces.

7. Air brake for railways comprising in combination with the engineer's valve a train air pipe, a handle, a governing chamber, means connected to the handle of said valve for producing different pressures in said chamber at different positions of said handle, means for producing corresponding pressures in the main air pipe, a feed air pipe, a regulating valve having movable means adapted to fill the said feed air pipe with air of constant pressure, and a member subjected to the air pressure of the said main air pipe and operatively connected to the said movable means so as to cause the feed air pipe pressure being altered in inverse sense as the main air pipe pressure.

In witness whereof I affix my signature.

FLORENTIN KASANTZEFF.